(12) United States Patent
Bakas et al.

(10) Patent No.: US 7,833,922 B2
(45) Date of Patent: Nov. 16, 2010

(54) METHOD OF FORMING ALUMINUM OXYNITRIDE MATERIAL AND BODIES FORMED BY SUCH METHODS

(75) Inventors: Michael P. Bakas, Ammon, ID (US);
Thomas M. Lillo, Idaho Falls, ID (US);
Henry S. Chu, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 171 days.

(21) Appl. No.: 12/350,316

(22) Filed: Jan. 8, 2009

(65) Prior Publication Data

US 2010/0173768 A1    Jul. 8, 2010

(51) Int. Cl.
*C04B 35/581*    (2006.01)
(52) U.S. Cl. .................. 501/96.1; 501/98.4; 501/153; 264/44; 264/643; 264/673
(58) Field of Classification Search ............. 501/96.1, 501/98.4, 153; 264/44, 643, 673
See application file for complete search history.

(56) References Cited

U.S. PATENT DOCUMENTS

| | | | |
|---|---|---|---|
| 3,821,005 A * | 6/1974 | Layden ................. 501/97.1 |
| 4,241,000 A | 12/1980 | McCauley et al. |
| 4,459,156 A | 7/1984 | Henslee et al. |
| 4,481,300 A | 11/1984 | Hartnett et al. |
| 4,520,116 A | 5/1985 | Gentilman et al. |
| 4,636,374 A | 1/1987 | Kurihara et al. |
| 4,686,070 A | 8/1987 | Maguire et al. |
| 4,720,362 A | 1/1988 | Gentilman et al. |
| 4,977,113 A | 12/1990 | Phelps et al. |
| 5,075,265 A | 12/1991 | Narula |
| 5,135,814 A | 8/1992 | Dekosky |
| 5,221,558 A | 6/1993 | Sonuparlak et al. |
| 5,231,062 A | 7/1993 | Mathers et al. |
| 5,260,241 A | 11/1993 | Addiego et al. |
| 5,456,306 A | 10/1995 | Aghajanian et al. |
| 5,480,676 A | 1/1996 | Sonuparlak et al. |
| 5,487,420 A | 1/1996 | Newkirk |
| 5,688,730 A | 11/1997 | Bachelard et al. |
| 5,707,442 A | 1/1998 | Fogel et al. |
| 6,156,686 A * | 12/2000 | Katsuda et al. ............. 501/96.1 |
| 6,740,299 B2 | 5/2004 | Carini et al. |
| 6,955,798 B2 | 10/2005 | Miao |
| 7,045,091 B1 | 5/2006 | Patel et al. |

(Continued)

OTHER PUBLICATIONS

Allaf et al., "Décomposition thermique des phosphates II. Le phosphate d'aluminum Al PO4," Rev. Int. hautes Termpér. Refract., vol. 19, 1982, pp. 88-89.

(Continued)

*Primary Examiner*—Karl E Group
(74) *Attorney, Agent, or Firm*—TraskBritt

(57) ABSTRACT

Methods of forming aluminum oxynitride (AlON) materials include sintering green bodies comprising aluminum orthophosphate or another sacrificial material therein. Such green bodies may comprise aluminum, oxygen, and nitrogen in addition to the aluminum orthophosphate. For example, the green bodies may include a mixture of aluminum oxide, aluminum nitride, and aluminum orthophosphate or another sacrificial material. Additional methods of forming aluminum oxynitride (AlON) materials include sintering a green body including a sacrificial material therein, using the sacrificial material to form pores in the green body during sintering, and infiltrating the pores formed in the green body with a liquid infiltrant during sintering. Bodies are formed using such methods.

33 Claims, 2 Drawing Sheets

U.S. PATENT DOCUMENTS

| | | | |
|---|---|---|---|
| 7,163,656 | B1 | 1/2007 | Gilde et al. |
| 7,247,589 | B2 * | 7/2007 | Krell et al. .................. 501/120 |
| 7,247,591 | B2 * | 7/2007 | Wei ............................ 501/153 |
| 7,368,406 | B2 | 5/2008 | Yeckley et al. |
| 7,459,122 | B2 | 12/2008 | Chu et al. |

OTHER PUBLICATIONS

Benitez et al., "Study of the Stability of AlPON Catalysts in an Aqueous Environment," Journal of the European Ceramic Society, v. 17, 1997, p. 1979.

Clay et al., "Effect of LiAl5O8 additions on the sintering and Optical Transparency of LiAlON," Journal of the European Ceramic Society, vol. 26, 2006, pp. 1351-1362.

Corbin, Normand D., "Aluminum Oxynitride Spinel: A Review," Journal of the European Ceramic Society, vol. 5, 1989, pp. 143-154.

Granon et al., "Aluminum Magnesium Oxynitride: A New Transparent Spinel Ceramic," J. European Ceramic Society, vol. 15, 1995, pp. 249-254.

Grover et al., "Low-Temperature Synthesis of Berlinite-Bonded Alumina Ceramics," American Ceramic Society Annual Meeting, 1999.

Kingery, William D., "Fundamental Study of Phosphate Bonding in Refractories," Journal of the American Ceramic Society, Aug. 1950, pp. 239-250.

Martin et al., "Synthesis and Hot Pressing of Transparent Aluminum Oxynitride," SPIE vol. 1112 Window and Dome Technologies and Materials, 1989, pp. 20-24.

McCauley et al., "High Temperature Reactions and Microstructures in the Al2O3-AlN System," Progress in Nitrogen Ceramics, ed. F.L. Riley, Martinus Nijhoff. Boston, MA, 1983, pp. 111-118.

McCauley et al., "Phase Relations and Reaction Sintering of Transparent Cubic Aluminum Oxynitride Spinel (ALON)," J. Am. Ceram. Soc., 62, 1979, pp. 476-479.

Michel et al., "Oxynitride Formation during Alumina Fusion in Air in the Presence of Aluminum," C.R. Acad. Sci. Ser. C, 263, 1966, p. 1366.

Olhero et al., "Thermodynamic Studies on the AlN Sintering Powders Treated with Phosphate Species," Journal of the American Ceramic Society, 90 [11] 3589-3595, 2007.

Taguchi et al., "Infiltration of Al2O3/Y2O3 Mix into SiC Ceramic Preforms," Ceramics International, vol. 34, 2008, pp. 625-629.

Toy et al., "Phosphate Bonding with Several Calcined Aluminas," Ceramics International, 15, 1989, p. 167.

Trumble, K. P., "Spontaneous Infiltration of Non-Cylindrical Porosity: Close-Packed Spheres," Acta. Mater. vol. 46, No. 7, 1998, pp. 2363-2367.

Wagh et al., "Chemically Bonded Phosphate Ceramics," Journal of the American Ceramic Society, 86 [11] p. 138.

Willems et al., "Mechanical properties of $\gamma$-aluminium oxynitride," Journal of Materials Science, vol. 28, 1993, pp. 6185-6189.

Zheng et al., "Carbothermal Synthesis of Aluminum Oxynitride (ALON) Powder: Influence of Starting Materials and Synthesis Parameters," Journal of the European Ceramic Society, vol. 15, 1995, pp. 1087-1100.

\* cited by examiner

METHOD OF FORMING ALUMINUM OXYNITRIDE MATERIAL AND BODIES FORMED BY SUCH METHODS

GOVERNMENT RIGHTS

This invention was made with government support under Contract No. DE-AC07-05ID14517 awarded by the United States Department of Energy. The government has certain rights in the invention.

TECHNICAL FIELD

Embodiments of the present invention relate to methods of fabricating aluminum oxynitride materials and bodies, and to materials and bodies formed by such methods.

BACKGROUND

Aluminum oxynitride (AlON) is a ceramic material comprising aluminum (Al), oxygen (O), and nitrogen (N) atoms. Aluminum oxynitride materials have been reported to exhibit a fracture strength of between about 450 megapascals (MPa) and about 500 megapascals (MPa), a fracture toughness of between about 2.6 MPa(m$^{1/2}$) and about 2.9 MPa(m$^{1/2}$), and a hardness of between about 15 gigapascals (GPa) and about 20 gigapascals (GPa). See e.g., H. X. Willems et al., *Mechanical properties of γ-aluminum oxynitride*, Journal of Materials Science 28, 6185-6189 (1993). Furthermore, aluminum oxynitride may be formed as a polycrystalline material, and may be formed to be at least substantially transparent to visible light.

Aluminum oxynitride has been used in a wide variety of applications for its physical properties, in additional applications for its transparency to visible light, and in yet further applications for both its physical properties and transparency. For example, due to its physical properties and its transparency to visible light, aluminum oxynitride is being investigated as a possible armor material.

Aluminum oxynitride may be manufactured using what is often referred to as a reaction sintering process, in which a mixture of powdered aluminum oxide (also referred to as "alumina") and powdered aluminum nitride is heated and reacted to form aluminum oxynitride material. In such methods, powdered aluminum oxide may be mixed with powdered aluminum nitride such that the resulting powder mixture has a composition of between about sixty (60) and eighty (80) mole percent (mol %) aluminum oxide, the remainder being aluminum nitride. The powdered aluminum oxide and powdered aluminum nitride each may have an average particle size of less than about one-hundred microns (100 μm). The powder mixture of aluminum oxide and aluminum nitride may be milled (e.g., in a ball mill) and subsequently calcined to form powdered aluminum oxynitride material. For example, the powder mixture may be calcined in a crucible (which may be formed of aluminum oxide) at a temperature of between about 1600° C. and about 1750° C. for about four (4) hours with a stagnant atmosphere of nitrogen gas (N$_2$) at a pressure range of between about zero (0) and about five (5) pounds per square inch gauge (psig).

In additional methods, aluminum oxynitride powder may be produced by heating aluminum oxide in the presence of nitrogen and a reducing agent. The reducing agent causes some of the aluminum oxide to react with the nitrogen to form aluminum nitride, which then reacts with the remaining aluminum oxide to form aluminum oxynitride powder. Common reducing agents include, for example, aluminum and carbon.

In the methods described above, agglomerates of aluminum oxynitride particles may form during the formation of the aluminum oxynitride particles themselves, and such agglomerates must be removed from the bulk powdered aluminum oxynitride material. Furthermore, the aluminum oxynitride particles often need to be ground to a finer average particle size prior to using the particles to form a three-dimensional solid aluminum oxynitride body from the particles. Such grinding processes may be difficult due to the relatively high hardness of the aluminum oxynitride material.

The resulting aluminum oxynitride powder then may be processed to form a three-dimensional solid body of aluminum oxynitride material. For example, the aluminum oxynitride powder may be used to form a green body, which then may be sintered to a desired final density. Such a green body may be formed by axially or isostatically pressing the aluminum oxynitride powder in a mold or die. Casting techniques (e.g., slip casting or tape casting) also may be used to form a green body from aluminum oxynitride powder.

After forming a green body, the green body may be sintered to a desired final density. The solidus line of the phase diagram for aluminum oxynitride material is located at approximately 2140° C. Solid-state sintering may be conducted at a temperature of between about 1900° C. and about 2140° C. for between about twenty (20) hours and about one-hundred (100) hours in a nitrogen gas atmosphere at a pressure range of between about zero (0) and about five (5) pounds per square inch gauge (psig).

The green body may be sintered with or without applied pressure. It has been observed, however, that sintering without applied pressure can result in porosity in the resulting sintered aluminum oxynitride body, which may cause a reduction in the transparency of the aluminum oxynitride body. Thus, standard pressureless sintering is generally considered to be incapable of attaining transparent aluminum oxynitride bodies.

Current methods for attaining sufficiently transparent aluminum oxynitride bodies employ the use of dopants in the green body and pressured sintering techniques, such as hot pressing (e.g., hot isostatic pressing) techniques. Hot pressing involves applying relatively high pressures to a body as the body is sintered. The applied pressure assists in the densification process and results in a significant reduction in the porosity of the fully sintered body. Furthermore, it has been observed that the inclusion of dopants (e.g., lanthanum (La), yttrium (Y), magnesium oxide (MgO) (often referred to as "magnesia"), and/or yttrium oxide (Y$_2$O$_3$) (often referred to as "yttria")) in the green body may further enhance the densification process during sintering, which may result in a further reduction in the porosity of the fully sintered body. It is believed that the dopants assist densification by forming a small amount of liquid phase during sintering that modified grain growth in a beneficial manner. In small amounts, the dopants will dissolve into the resulting aluminum oxynitride material and will not form detrimental phases therein.

BRIEF SUMMARY OF THE INVENTION

In some embodiments, the present invention includes methods of forming aluminum oxynitride (AlON) material that employ the use of aluminum orthophosphate (AlPO$_4$) (often referred to as "berlinite") or another sacrificial material. For example, a green body may be formed that comprises aluminum (Al), oxygen (O), nitrogen (N), and aluminum orthophosphate, and the green body may be sintered. In some embodiments, a green body may be formed from a powder mixture that includes aluminum oxide (Al$_2$O$_3$), aluminum nitride (AlN), and a phosphate containing material most preferably aluminum orthophosphate. Optionally, the molar ratio of aluminum oxide to aluminum nitride in the powder mixture may be tailored to be between about 1.25 and about 4.0. Furthermore, the concentration of aluminum orthophosphate in the powder mixture optionally may be tailored to be about fifteen percent (15%) by weight or less. After forming the green body, the green body may be sintered to form a three-dimensional solid body of aluminum oxynitride material.

In additional embodiments, the present invention includes methods of forming aluminum oxynitride material that employ the use of a sacrificial material and an infiltrant. For example, a green body may be formed that includes aluminum, oxygen, nitrogen, and a sacrificial material, and the green body may be sintered. As the green body is sintered, pores are formed within the green body from the sacrificial material, and the pores are infiltrated with a liquid as the green body is sintered. Optionally, the sacrificial material may comprise aluminum orthophosphate, and the green body may be formed from a powder mixture comprising the aluminum oxide, aluminum nitride, and the aluminum orthophosphate. An infiltrant may be provided adjacent the green body. As the green body is sintered, at least one gas may be formed within the green body from the aluminum orthophosphate, and the gas may cause the formation of pores within the green body. The pores formed within the green body may be infiltrated with the infiltrant as the green body is sintered.

In yet further embodiments, the present invention includes bodies formed by the methods described herein. For example, embodiments of the present invention include green bodies comprising materials that may be used to form aluminum oxynitride upon sintering, as well as aluminum orthophosphate or another sacrificial material. Materials that may be used to form aluminum oxynitride include aluminum atoms, oxygen atoms, and nitrogen atoms. As a non-limiting example, an embodiment of a green body of the present invention may comprise an at least substantially homogenous mixture of aluminum oxide, aluminum nitride, and aluminum orthophosphate.

BRIEF DESCRIPTION OF THE SEVERAL VIEWS OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings in which:

DETAILED DESCRIPTION OF THE INVENTION

Figure 1:
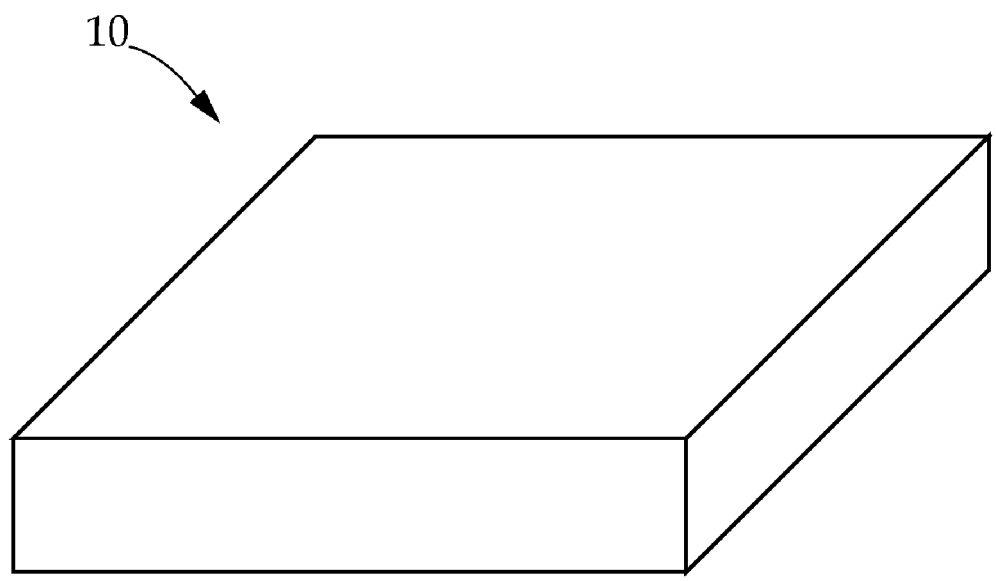
FIG. 1 is an isometric view of a green body that may be sintered to form a three-dimensional solid three-dimensional body of aluminum oxynitride (AlON) material in accordance with embodiments of the present invention.

The illustrations presented herein are not meant to be actual views of any particular structure, device, or system, but are merely idealized representations that are employed to describe various embodiments of the present invention. It is noted that elements that are common between figures may retain the same numerical designation.

As used herein, the term "high transmittance" means a transmittance of at least 60% of at least some wave lengths of electromagnetic radiation within a region of electromagnetic radiation spectrum visible to a human, the region being preferably between about 380 nm and about 750 nm in standard atmospheric conditions at sea level.

As used herein, the term "at least substantially transparent" means a transmittance of at least 80% of at least some wave lengths of electromagnetic radiation within a region of electromagnetic radiation spectrum visible to a human, the region being preferably between about 380 nm and about 750 nm in standard atmospheric conditions at sea level.

As used herein, the term "pressureless sintering" means sintering under pressures of about five (5.0) pounds per square inch gauge (psig) or less.

As used herein, the term "low pressure sintering" means sintering under pressures of about one-thousand (1,000) pounds per square inch gauge (psig) or less. Low pressure sintering processes include pressureless sintering processes.

As used herein, the term "green body" means a less than fully sintered body. Green bodies include, for example, bodies formed from particulate matter, as well as bodies formed by partially sintering particulate matter.

As used herein, the term "sacrificial material" means a material that, if present in a green body prior to sintering, will not be present, at least in the same form, in any significant quantity within the fully sintered body formed by sintering the green body to a final density.

The present invention relates generally to methods of forming three-dimensional aluminum oxynitride (AlON) bodies that exhibit high transmittance, and, in some embodiments, may be at least substantially transparent to electromagnetic radiation over a desired range of wavelengths of electromagnetic radiation using low pressure or pressureless sintering techniques.

A sacrificial material may be included in a green body comprising aluminum (Al), oxygen (O), and nitrogen (N). In some embodiments, the green body initially (i.e., prior to sintering) may be at least substantially free of aluminum oxynitride material. For example, the material of the green body may be at least substantially comprised of a powder mixture of aluminum oxide ($Al_2O_3$), aluminum nitride (AlN), and aluminum orthophosphate ($AlPO_4$) (often referred to as "berlinite"). The sacrificial material may comprise a material that, as the temperature is raised during the sintering process, will initially result in the formation of a liquid phase within the green body, and that will subsequently vaporize, decompose, or otherwise leave the green body as one or more gaseous byproducts. By way of example and not limitation, the sacrificial material may comprise, for example, aluminum orthophosphate. The liquid phases formed by the sacrificial material should wet the surfaces of the other particles within the green body to assist the densification process during sintering. Such methods are discussed in further detail below.

Aluminum oxide powder, aluminum nitride powder, and aluminum orthophosphate powder may be mixed together to form a relatively uniform powder mixture. For example, the powder mixture may be suspended in a fluid medium such as, for example, ethanol, and a high shear mixer device may be used to attain an at least substantially uniform mixture of the powders in the fluid medium. One example of a commercially available shear mixer is the L4RT-A laboratory mixer sold by Silverson Machines, Inc. of East Longmeadow, Mass. The resulting suspension then may be allowed to dry, leaving behind a relatively uniform mixture of the aluminum oxide powder, the aluminum nitride powder, and the aluminum orthophosphate powder. Other methods also may be used to attain an at least substantially uniform mixture of the powders.

The molar ratio of aluminum oxide to aluminum nitride in the powder mixture may be between about 1.25 and about 4.0. In other words, the number of moles of aluminum oxide in the powder mixture may be between about 1.25 and about 4.0 times greater than the number of moles of aluminum nitride in the powder mixture. Furthermore, the aluminum orthophosphate powder may comprise about fifteen percent (15%) by weight or more of the powder mixture.

Referring to FIG. 1, after forming the powder mixture, the powder mixture may be formed into a three dimensional green body 10. The green body 10 shown in FIG. 1 has the shape of a rectangular prism, although it is understood green bodies formed in accordance with embodiments of the present invention may have any simple or complex three-dimensional shape, which will be at least partly determined by the desired shape of the ultimate fully sintered three-dimensional aluminum oxynitride body to be formed from the green body 10.

Various shape-forming processes are known in the art and may be used to form a green body 10 from the powder mixture. For example, pressing processes may be used to form a green body 10 from the powder mixture. Pressing processes include, for example, uniaxial pressing processes and isostatic pressing processes. Casting processes also may be used to form a green body 10 from the powder mixture. Casting processes include, for example, slip casting processes and tape casting processes. In slip casting, the powder mixture may be suspended in a liquid medium to form a liquid suspension, and the liquid suspension then may be cast in a mold or die to form the green body. Plastic forming processes also may be used to form a green body 10 from the powder mixture. Plastic forming processes involve producing shapes from a mixture of powder and polymeric additives that together form a paste-like material that then may be shaped into a green body by, for example, extrusion processes and molding processes (e.g., injection molding and compression molding).

In additional embodiments of the present invention, aluminum oxide powder, aluminum nitride powder, and aluminum orthophosphate powder may be suspended in a fluid medium such as, for example, ethanol to form a liquid suspension, and a casting process then may be used to form the green body 10 in a mold or die directly from the liquid suspension (without drying the liquid suspension prior to the casting process).

In yet further embodiments of the present invention, aluminum oxide powder and aluminum nitride powder may be suspended in a fluid medium such as, for example, ethanol to form a liquid suspension. One or more aluminum orthophosphate precursor materials such as, for example, phosphoric acid, and, if necessary or desirable, aluminum hydroxide, then may be added to the liquid suspension. A casting process then may be used to form the green body 10 in a mold or die directly from the liquid suspension. The green body 10 then may be subjected to a thermal treatment to cause the aluminum orthophosphate precursor materials (e.g., aluminum hydroxide and phosphoric acid) to react with one another and form aluminum orthophosphate in situ within the green body 10. For example, the green body 10 may be heated to about 130° C. or more (e.g., 150° C.) for between about twelve (12) hours and about seventy-two (72) hours (e.g., about twenty-four (24) hours) to cause the aluminum orthophosphate precursor materials (e.g., aluminum hydroxide and phosphoric acid) to react with one another and form aluminum orthophosphate in situ within the green body 10. The aluminum orthophosphate formed within the green body 10 may bond the particles of aluminum oxide and aluminum nitride within the green body 10 together and, as a result, may reduce the fragility of the green body 10, which may enhance the ability to handle and manipulate the green body 10 prior to sintering.

Figure 2:
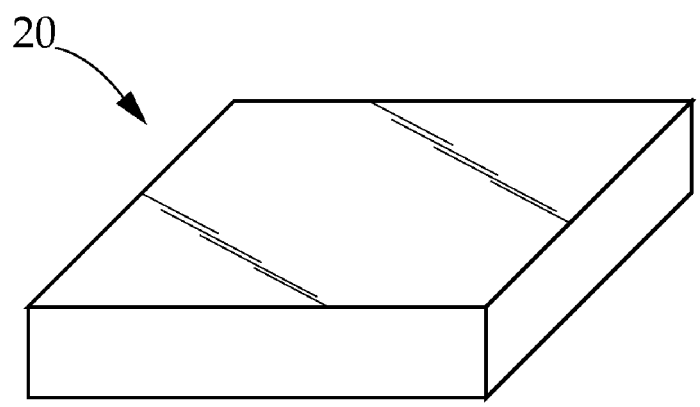
FIG. 2 is an isometric view of a solid three-dimensional body of aluminum oxynitride material that may formed by sintering the green body shown in FIG. 1 in accordance with embodiments of the present invention.

After forming a green body 10, the green body 10 may be sintered to a desired final density to form a fully sintered three-dimensional solid body 20 of aluminum oxynitride material, as shown in FIG. 2. In some embodiments, the three-dimensional solid body 20 of aluminum oxynitride material may exhibit high transmittance to electromagnetic radiation over a range of wavelengths. For example, the three-dimensional solid body 20 may exhibit a high transmittance to electromagnetic radiation over the range of visible wavelengths, which extends from about three-hundred and eighty nanometers (380 nm) to about seven-hundred and fifty nanometers (750 nm). In additional embodiments, the three-dimensional solid body 20 of aluminum oxynitride material may be at least substantially transparent to electromagnetic radiation over a range of wavelengths.

Sintering may be conducted within a furnace in, for example, nitrogen gas ($N_2$). Furthermore, the sintering may comprise a low pressure or a pressureless sintering process. For example, the green body 10 may be sintered at a pressure of about one-thousand (1,000) pounds per square inch gauge (psig) or less, or even at a pressure of about five (5.0) pounds per square inch gauge (psig) or less.

During the sintering process, the temperature within the furnace may be heated to a temperature at which the aluminum orthophosphate or other sacrificial material will cause the formation of a liquid phase within the green body 10, and then to a temperature that will cause the aluminum orthophosphate or other sacrificial material to vaporize, decompose, or otherwise leave the green body 10 as one or more gaseous products. For example, the temperature within the furnace may be increased at a rate of about ten degrees Celsius (10° C.) per minute to about 1970° C. The temperature within the furnace then may be held at about 1970° C. for about fifteen (15) hours or more (e.g., about thirty (30) hours), after which the temperature within the furnace may be decreased at a rate of about one degrees Celsius (1° C.) per minute to about 1775° C., after which the temperature be decreased at a rate of about ten degrees Celsius (10° C.) per minute to about room temperature.

It is believed that the aluminum orthophosphate, during sintering, will first result in the formation of liquid phases within the body that will enhance the densification process, and will then decompose to form, for example, phosphorous pentoxide ($P_2O_5$) gas and aluminum oxide. The phosphorous pentoxide gas will exit the body as a gaseous byproduct, and the aluminum oxide will be incorporated into the resulting aluminum oxynitride material of the sintered body 20. As a result, embodiments of the present invention may allow the formation of three-dimensional solid bodies 20 of aluminum oxynitride material to exhibit a high transmittance to certain wavelengths of electromagnetic radiation using low pressure or pressureless sintering techniques. Embodiments of the present invention also may allow the formation of three-dimensional solid bodies 20 of aluminum oxynitride material that are at least substantially transparent to certain wavelengths of electromagnetic radiation using low pressure or pressureless sintering techniques.

Additional embodiments of the present invention may employ an infiltration process in the formation of a three-dimensional solid body 20 of aluminum oxynitride material.

For example, in some embodiments of the present invention, an infiltrant may be caused to infiltrate pores in a green body, at least some of which may be formed as a result of the vaporization or decomposition of a sacrificial material previously present in the green body.

Figure 3:
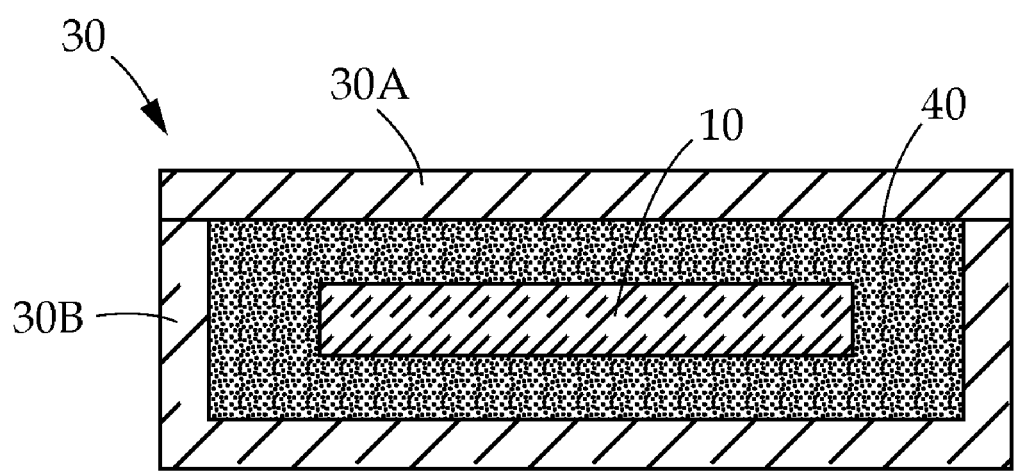
FIG. 3 is a cross-sectional view illustrating a green body like that shown in FIG. 1 positioned within a crucible and surrounded by powder in preparation for sintering in accordance with embodiments of the present invention.

Referring to FIG. 3, a green body 10 may be positioned within a crucible 30, which may have a cup or container portion 30A and a cap or lid portion 30B. The crucible 30 may be at least substantially comprised of, for example, boron nitride (BN). The green body 10 may be formed as previously described herein, and may include aluminum, oxygen, and nitrogen in respective concentrations that will enable the formation of an aluminum oxynitride material from the green body 10. In some embodiments, the green body 10 initially (i.e., prior to sintering) may be at least substantially free of aluminum oxynitride material. For example, the material of the green body 10 may be at least substantially comprised of a powder mixture of aluminum oxide, aluminum nitride, and a sacrificial material such as aluminum orthophosphate.

As shown in FIG. 3, an infiltrant material, or a material that will form an infiltrant material may be provided adjacent the green body 10 within the crucible 30. For example, the green body 10 may be at least partially surrounded by a settling powder 40 within the crucible 30. The settling powder 40 may comprise a material that, upon heating, will melt and form a liquid infiltrant that will infiltrate pores in the green body 10. For example, the settling powder 40 may comprise a mixture of aluminum oxide, aluminum nitride, and a small amount of a dopant such as, for example, yttrium oxide that will result in the formation of a liquid phase from the settling powder 40 upon heating. The yttrium oxide may comprise between about one-half of one percent (0.5%) and about one percent (1.0%) by weight of the settling powder 40 (e.g., about seven tenths of one percent (0.7%) by weight of the settling powder 40).

The dopant (e.g., yttrium oxide) in the settling powder 40 promotes the formation of the liquid phase and enables the liquid phase to wet the surfaces of the green body 10. The liquid phase formed from the settling powder 40 upon heating should be stable at temperatures above those at which the sacrificial material (e.g., aluminum orthophosphate) will vaporize, decompose, or otherwise leave the green body 10 during sintering.

By way of example and not limitation, the molar ratio of aluminum oxide to aluminum nitride in the settling powder 40 may be between about 1.25 and about 4.0. In other words, the number of moles of aluminum oxide in the settling powder 40 may be between about 1.25 and about 4.0 times greater than the number of moles of aluminum nitride in the settling powder 40. In some embodiments, the molar ratio of aluminum oxide to aluminum nitride in the settling powder 40 may be at least substantially equal to the molar ratio of aluminum oxide to aluminum nitride in the powder mixture used to form the green body 10. In additional embodiments, the molar ratio of aluminum oxide to aluminum nitride in the settling powder 40 may differ from the molar ratio of aluminum oxide to aluminum nitride in the powder mixture used to form the green body 10. For example, in some embodiments, the molar ratio of aluminum oxide to aluminum nitride in the settling powder 40 may be about 1.25, and the molar ratio of aluminum oxide to aluminum nitride in the powder mixture used to form the green body 10 may be about 4.0.

The amount of settling powder 40 used may vary depending on the size and geometry of the green body 10. As a non-limiting example, the weight of the settling powder 40 may be between about one (1) and about two (2) times greater then the weight of the green body 10 (e.g., about 1.6 times greater than the weight of the green body 10).

The green body 10 embedded within the settling powder 40 in the crucible 30 then may be sintered as previously discussed herein. During the sintering process, the aluminum orthophosphate (or other sacrificial material) will first result in the formation of one or more liquid phases within the body 10 that will enhance the densification process. Further heating will then cause the aluminum orthophosphate to decompose to form, for example, phosphorus pentoxide gas and aluminum oxide. The phosphorus pentoxide gas will exit the body 10 as a gaseous byproduct and leave behind pores in the body 10. Also during the sintering process, liquid phases will form in and from the settling powder 40, and such liquid phases will spontaneously infiltrate the pores in the body 10, which may further enhance the densification process. The densification process may result in the formation of a three-dimensional solid body 20 (FIG. 2) of at least substantially pure aluminum oxynitride material containing a relatively small amount of yttrium oxide (or another dopant) as an impurity that remains from the infiltration process. Furthermore, the three-dimensional solid body 20 (FIG. 2) may exhibit high transmittance to certain wavelengths of electromagnetic radiation (e.g., visible wavelengths), and may be at least substantially transparent to certain wavelengths of electromagnetic radiation (e.g., visible wavelengths).

After the sintering process, the solid body 20 of aluminum oxynitride material may be removed from the crucible 30, and any remnants of the settling powder 40 may be removed from surfaces of the solid body 20 of aluminum oxynitride.

As a non-limiting example of the methods described hereinabove, a green body 10 weighing approximately five (5.0) grams may be at least substantially comprised of aluminum oxide, aluminum nitride, and aluminum orthophosphate may be sintered within a crucible 30 in about 7.3 grams of a settling powder 40 comprising a powder mixture of aluminum oxide, aluminum nitride, and yttrium oxide, in a manner like that previously discussed with reference to FIG. 3. The molar ratio of aluminum oxide to aluminum nitride in the green body 10 may be about 1.26, and the aluminum orthophosphate may comprise about fifteen percent (15%) by weight of the green body 10. The molar ratio of aluminum oxide to aluminum nitride in the settling powder 40 may be about 4.00, and the yttrium oxide may comprise about seven tenths of one percent (0.7%) of the settling powder 40. The crucible 30, the green body 10, and the settling powder 40 may be heated within a furnace at a rate of about ten degrees Celsius (10° C.) per minute to a temperature of about 1970° C. The temperature within the furnace then may be held at about 1970° C. for about thirty (30) hours, after which the temperature within the furnace may be decreased at a rate of about one degrees Celsius (1° C.) per minute to about 1775° C., and then the temperature be decreased at a rate of about ten degrees Celsius (10° C.) per minute to room temperature. The resulting fully sintered body may have a density of about 3.676 grams per cubic centimeter or more.

Optionally, thermal treatment processes may be used to selectively tailor the microstructure of the solid body 20 after the sintering process. For example, after the removing any remnants of the settling powder 40 from surfaces of the solid body 20 of aluminum oxynitride, the solid body 20 again may be placed within a crucible 30 (like that shown in FIG. 3) and at least partially surrounded with a packing powder (not shown). The solid body 20 may be embedded within the packing powder in substantially the same manner in which the solid body 20 is embedded within the settling powder 40, as previously described with reference to FIG. 3.

The packing powder may comprise a powder that will protect the solid body 20 during a thermal treatment process. For example, the packing powder may comprise a mixture of aluminum oxide and aluminum nitride. By way of example and not limitation, the molar ratio of aluminum oxide to aluminum nitride in the packing powder may be between about 1.25 and about 4.0. In other words, the number of moles of aluminum oxide in the packing powder may be between about 1.25 and about 4.0 times greater than the number of moles of aluminum nitride in the packing powder. In some embodiments, the molar ratio of aluminum oxide to aluminum nitride in the packing powder may be at least substantially equal to the molar ratio of aluminum oxide to aluminum nitride in the settling powder 40 and/or the powder mixture used to form the green body 10. In additional embodiments, the molar ratio of aluminum oxide to aluminum nitride in the packing powder may differ from the molar ratio of aluminum oxide to aluminum nitride in the settling powder 40 and/or the powder mixture used to form the green body 10.

The solid body 20 in the packing powder within the crucible 30 then may be subjected to an annealing process at a temperature of about 1950° C. for between about twenty-four (24) hours and about sixty (60) hours to cause grain growth within the solid body 20 until a desirable microstructure is attained.

Embodiments of the present invention may provide improved methods of forming three-dimensional solid bodies of aluminum oxynitride material, which may exhibit a high transmittance to certain wavelengths of radiation (e.g., visible radiation), and may be at least substantially transparent to certain wavelengths of radiation (e.g., visible radiation). Furthermore, such three-dimensional solid bodies of aluminum oxynitride material may be formed using low pressure sintering and pressureless sintering processes in accordance with embodiments of the present invention. Embodiments of the present invention may find utility in a wide variety of applications including, by way of example and not limitation, impact resistant windows for use in buildings and impact resistant windshields and windows for use in vehicles.

While the invention is susceptible to various modifications and implementation in alternative forms, specific embodiments have been shown by way of non-limiting example in the drawings and have been described in detail herein. However, it should be understood that the invention is not intended to be limited to the particular forms disclosed. Rather, the invention includes all modifications, equivalents, and alternatives falling within the scope of the invention as defined by the following appended claims and their legal equivalents.

What is claimed is:

1. A method of forming an aluminum oxynitride material, comprising:
    forming a green body comprising aluminum, oxygen, nitrogen, and aluminum orthophosphate; and
    sintering the green body.

2. The method of claim 1, wherein forming the green body comprises causing the green body to be at least substantially free of aluminum oxynitride material prior to sintering the green body.

3. The method of claim 2, wherein forming a green body comprises:
    mixing aluminum oxide, aluminum nitride, and aluminum orthophosphate to form a powder mixture; and
    forming the green body from the powder mixture.

4. The method of claim 3, wherein forming the green body comprises pressing the powder mixture to form the green body.

5. The method of claim 3, wherein forming the green body comprises:
    suspending the powder mixture in a liquid to form a liquid suspension; and
    casting the liquid suspension to form the green body.

6. The method of claim 3, wherein forming the green body comprises:
    mixing the powder mixture with a polymeric material to form a paste; and
    extruding or molding the paste to form the green body.

7. The method of claim 1, wherein sintering the green body comprises sintering the green body at a pressure of about one-thousand (1,000) pounds per square inch gauge (psig) or less.

8. The method of claim 7, wherein sintering the green body comprises sintering the green body at a pressure of about five (5.0) pounds per square inch gauge (psig) or less.

9. The method of claim 8, wherein sintering the green body further comprises forming a three-dimensional solid body of the aluminum oxynitride material from the green body that exhibits a transmittance of at least sixty percent (60%) to at least some wavelengths of electromagnetic radiation within a region of electromagnetic radiation spectrum visible to a human.

10. The method of claim 9, wherein sintering the green body further comprises forming a three-dimensional solid body of the aluminum oxynitride material from the green body that exhibits a transmittance of at least eighty percent (80%) to at least some wavelengths of electromagnetic radiation within a region of electromagnetic radiation spectrum visible to a human.

11. The method of claim 1, wherein sintering the green body comprises:
    forming pores within the green body as the green body is sintered; and
    infiltrating the pores with a liquid as the green body is sintered.

12. A method of forming an aluminum oxynitride material, comprising:
    forming a green body comprising aluminum oxide, aluminum nitride, and aluminum orthophosphate;
    tailoring a molar ratio of aluminum oxide to aluminum nitride in the green body to be between about 1.25 and about 4.0;
    tailoring a concentration of the aluminum orthophosphate in the green body to be greater than about fifteen percent (15%) by weight; and
    sintering the green body and forming a three-dimensional solid body of the aluminum oxynitride material from the green body.

13. The method of claim 12, wherein forming a three-dimensional solid body of the aluminum oxynitride material from the green body comprises forming the three-dimensional solid body to exhibit a high transmittance to at least some wavelengths of electromagnetic radiation within the visible region of the electromagnetic radiation spectrum.

14. The method of claim 12, wherein sintering the green body and forming a three-dimensional solid body of the aluminum oxynitride material from the green body comprises:
    forming pores within the green body as the green body is sintered; and
    infiltrating the pores with a liquid as the green body is sintered.

15. A method of forming an aluminum oxynitride material, comprising:
    forming a green body comprising aluminum, oxygen, nitrogen, and a sacrificial material; and sintering the green body, comprising:
   forming pores within the green body from the sacrificial material as the green body is sintered; and
   infiltrating the pores with a liquid as the green body is sintered.

16. The method of claim 15, wherein forming pores within the green body comprises decomposing the sacrificial material to form one or more gaseous byproducts.

17. The method of claim 16, further comprising selecting the sacrificial material to comprise aluminum orthophosphate.

18. The method of claim 15, wherein infiltrating the pores with the liquid comprises:
   at least partially surrounding the green body with a settling powder; and
   at least partially melting the settling powder to form the liquid.

19. The method of claim 18, further comprising forming the settling power to comprise a mixture of aluminum oxide, aluminum nitride, and a dopant.

20. The method of claim 19, further comprising selecting the dopant to comprise yttrium oxide.

21. The method of claim 15, further comprising sintering the green body using a low pressure sintering process.

22. The method of claim 21, further comprising sintering the green body using a pressureless sintering process.

23. A method of forming an aluminum oxynitride material, comprising:
   mixing aluminum oxide, aluminum nitride, and a phosphate-containing material to form a mixture;
   forming a green body from the mixture;
   providing an infiltrant adjacent the green body; and
   sintering the green body, wherein sintering the green body comprises:
      forming at least one gas from the phosphate-containing material;
      forming pores within the green body using the gas; and
      infiltrating the pores with the infiltrant as the green body is sintered.

24. The method of claim 23, further comprising selecting the phosphate-containing material to comprise at least one of phosphoric acid and aluminum orthophosphate.

25. The method of claim 24, wherein selecting the phosphate-containing material to comprise at least one of phosphoric acid and aluminum orthophosphate comprises selecting the phosphate-containing material to comprise phosphoric acid.

26. The method of claim 25, further comprising thermally treating the green body to form aluminum orthophosphate within the green body from the phosphoric acid.

27. The method of claim 23, further comprising sintering the green body using a low pressure sintering process.

28. The method of claim 27, further comprising sintering the green body using a pressureless sintering process.

29. The method of claim 23, further comprising forming the infiltrant by melting a mixture of aluminum oxide, aluminum nitride, and at least one dopant.

30. The method of claim 29, further comprising selecting the at least one dopant to comprise yttrium oxide.

31. A green body comprising an at least substantially homogenous mixture of aluminum oxide, aluminum nitride, and aluminum orthophosphate.

32. The green body of claim 31, wherein a molar ratio of aluminum oxide to aluminum nitride in the green body is between about 1.25 and about 4.0.

33. The green body of claim 31, wherein the aluminum orthophosphate comprises at least fifteen percent (15%) by weight of the green body.

* * * * *